United States Patent [19]
Stern et al.

[11] Patent Number: 5,763,539
[45] Date of Patent: Jun. 9, 1998

[54] PROCESS FOR PRODUCING POLYMERS OF α,ω-UNSATURATED CONJUGATED COMPOUNDS

[75] Inventors: Roland Stern, Wiesbaden, Germany; Dirk Vanderzande, Nieuwerkerken, Belgium; Frank Louwet, Diepenbeek, Belgium; Joanes Gelan, Genk, Belgium; Anna Issaris, Dilsen, Belgium; Michael van der Broght, Kortessem, Belgium

[73] Assignee: Hoechst Aktiengesellschaft, Frankfurt, Germany

[21] Appl. No.: 538,409

[22] Filed: Oct. 2, 1995

[30] Foreign Application Priority Data

Oct. 4, 1994 [EP] European Pat. Off. ............ 94115584

[51] Int. Cl.$^6$ .................................................. C08F 283/00
[52] U.S. Cl. ..................... 525/535; 528/330; 528/331; 526/89; 526/210; 526/217; 526/222; 313/483
[58] Field of Search ............... 525/535; 528/330, 528/331; 526/89, 210, 217, 222; 313/483

[56] References Cited

U.S. PATENT DOCUMENTS 5,189,136  2/1993  Wudl et al. .

FOREIGN PATENT DOCUMENTS

| 0182548 | 5/1986 | European Pat. Off. . |
| 0443861 | 8/1991 | European Pat. Off. . |
| WO 88/00954 | 2/1988 | WIPO . |
| WO 90/13148 | 11/1990 | WIPO . |
| WO 91/15534 | 10/1991 | WIPO . |

OTHER PUBLICATIONS

Journal of Molecular Electronics, vol. 4, (1988) by R.H. Friend entitled "Optical Investigations of Conjugated Polymers", pp. 37–46.

Journal of Polymer Science: Polymer Symposium, 72, (1985) by R.A. Wessling, entitled "The Polymerization of Xylylene Bisdialkyl Sulfonium Salts", pp. 54–66.

Journal of Polymer Science: Part A–1, vol. 4, 1337–1349 (9166) by Gilch et al. entitled "Polymerization of α-Halogenated p–Xylenes with Base", pp. 1337–1349.

Journal of Polymer Science: Part A: Polymer Chemistry, vol. 26, (1988) by Lenz et al., entitled "Preparation of Poly(phenylene Vinylene) from Cycloalkylene Sulfonium Salt Monomers and Polymers", pp. 3241–3249.

Polymer, 1993, vol. 34, No. 6, by Brooke et al., entitled "Reactions Proceeding via the Reactive Intermediate α–vinyl–p–xylylene. Contrasting Orientations in the Formation of Cyclic Dimers and Polymer", pp. 1282–1288.

W.J. Swatos et al., Polymer Preparation, vol. 31 (1), (1990), pp. 505–506.

H.H. Hörhold et al., Makromol. Chem. vol. 131, (1970), pp. 105–132.

Polymer, 1992, vol. 33, No. 15, by Liang et al., entitled "Highly Conductive Crystalline Poly(2–Methoxy–P–Phenylene Vinylene", pp. 3101–3107.

Synthetic Metals, 52 (1992) by Louwet et al., entitled "The Synthesis of Poly(1,4–Phenylene–1,2–Ethanediyl) Derivatives: An Adaptation of the Essling Route", pp. 125–130.

Synthetic Metals, 51 (1992) by Eevers et al., entitled "Poly(2,5–Heteroarylene Vinylene) from a Precursor Polymer Soluble in Organic Solvents", pp. 329–339.

*Primary Examiner*—Duc Truong
*Attorney, Agent, or Firm*—Frommer Lawrence & Haug LLP

[57] ABSTRACT

A process for producing polymers of α,ω-unsaturated conjugated compounds, comprising reacting a precursor monomer of the formula I,

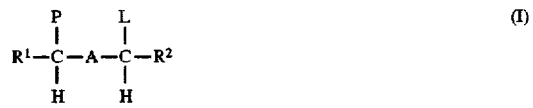

(I)

wherein P denotes —SR$^3$, —SO—R$^3$, —SO$_2$—R$^3$, —COOR$^3$, —NO$_2$, —CN, —CF$_3$ or R$^3$; L denotes —Cl, —Br, —I, —O-tosylate, —O-mesylate, —O-triflate, —(NR$^3{}_3$)⊕ or —(SR$^3$R$^4$)⊕; R$^1$,R$^2$ are the same or different and denote H, R$^3$ or P; R$^3$, R$^4$ and A are as defined in the application. This reaction is characterized in that, on reaction of the base with the compound of the formula (I), a polymer is formed which is essentially soluble in said solvent, and a salt is formed as a by-product, which is essentially soluble in the solvent. That solvent comprises a compound selected from the group consisting of a) amides of the general formula (II) R$^5$—CO—NR$^6$H; b) amines of the general formula (III) R$^7{}_2$—N—R$^8$; c) sulfones of the general formula (IV) R$^8$—SO$_2$—R$^9$; d) sulfoxides of the general formula (V) R$^8$—SO—R$^9$; and e) a solvent from the group consisting of alcohols, polyalcohols, glycols and polyethers, where R$^5$, R$^6$, R$^7$, R$^8$, and R$^9$ are as defined in the application. The process provides chemically and thermally stable, high molecular weight polymers of high purity and high regularity, in good yield. When the products of the novel process carry groups that undergo elimination to form double bonds, high quality electroluminescent materials can be prepared.

5 Claims, No Drawings

PROCESS FOR PRODUCING POLYMERS OF α,ω-UNSATURATED CONJUGATED COMPOUNDS

The present invention relates to a process for producing polymers of α,ω-unsaturated conjugated compounds which contain aromatic ring systems. It also relates to electroluminescent devices comprising such polymers.

There is an urgent industrial need for large-area solid-state light sources, for a wide range of applications mostly related to display technologies, and there is no fully satisfactory technology at present. Polymer-based electroluminescent devices are very promising and they offer several advantages over conventional, inorganic light-emitting diodes and liquid-crystal displays. These advantages include the availability of the whole color spectrum, the ability to make large-area electroluminescent devices, the ability to make flexible displays, and the high brightness of the luminescence. This is combined with simple processing technology and low fabrication costs. Furthermore, displays of this type do not need backlighting, in contrast to liquid-crystal displays.

Polymer-based electroluminescent devices are described, e.g., in WO 90/13 148 and EP-A 0 443 861. A typical device as described in WO 90/13 148 is made up of a semiconductor layer in the form of a thin dense polymer film comprising at least one conjugated polymer, a first contact layer in contact with a first surface of the semiconductor layer, and a second contact layer in contact with a second surface of the semiconductor layer, wherein the polymer film of the semiconductor layer has a sufficiently low concentration of extrinsic charge carriers that on applying an electric field between the first and second contact layers across the semiconductor layer so as to render the second contact layer positive relative to the first contact layer charge carriers are injected into the semiconductor layer and radiation is emitted from the semiconductor layer.

The polymer employed as a semiconductor layer in these devices is conjugated. By conjugated polymer is meant a polymer which possesses a delocalized π-electron system along the polymer backbone; the delocalized π-electron system confers semiconducting properties to the polymer and gives it the ability to support positive and/or negative charge carriers with high mobilities. Such polymers are discussed, for example, by R. H. Friend in J. Mol. Elec. 4, (1988) 37.

Poly(p-phenylene vinylene) [PPV] is utilized as a charge conducting layer in WO 90/13 148, and it is suggested in this document to have substituents on the phenylene ring or to replace phenylene with a fused carbocyclic system or a heterocyclic system. Conductive layers made of poly (aniline) [PAn] and poly(2,5-thienylene vinylene) [PTV] are described in EP-A 0 443 861.

Highly conjugated polymers, such as PPV or PTV, are generally insoluble and infusible because of the stiffness of their backbone. Consequently they are difficult to process. A solution to this problem is their synthesis via soluble precursor polymers or the use of specifically substituted monomers which lead to soluble, specifically sidechain substituted conjugated polymers.

The synthesis via precursor polymers proceeds, for example, according to the so-called Wessling bis-(sulphonium salt) precursor route (R. A. Wessling, J. Polym. Sci., Polym. Symp. 72 (1985) 55.). For example, PPV precursor polymers can be prepared by treating an α,α'-bis (sulfonium chloride)-p-xylene, e.g., α,α'-bis (tetrahydrothiophenium chloride)-p-xylene, with NaOH in water or alcohols as a solvent to yield a sulphonium polyelectrolyte. This precursor polymer is soluble and can be processed, e.g. by spin-coating or film-casting. On heating the precursor polymer, PPV is formed by elimination of tetrahydrothiophene and HCl. Although this is a versatile method for the preparation of a wide range of poly(arylene vinylenes) there are two major drawbacks. Firstly, the polyelectrolyte nature of the precursor makes filtration of the precursor solutions difficult or even impossible. This is a severe restriction for all applications were small insoluble particles, like dust, have to be avoided, e.g. for electroluminescent devices. Secondly, the precursor polymers are thermally and chemically unstable. They have to be stored well below zero degree centigrade to prevent partial elimination leading to an insoluble polymer with conjugated segments and they are susceptible to substitution reactions, in particular with the commonly used solvents water and methanol. The mechanism of the formation of the precursor polymer is believed to proceed via an in situ generation of a true monomer, possibly a p-quinodimethane system. Polymerization reactions of p-quinodimethane systems are well known in the literature (e.g., H. G. Gilch and W. L. Wheelwright, J. Polym. Sci. A14 (1966) 1337; R. W. Lenz et al, J. Polym. Sci., Polym. Chem. 26 (1988) 3241; G. M. Brooke and M. F. Woolley, Polymer 34 (1993) 1282).

Specifically substituted monomers which lead to specific sidechain-substituted conjugated polymers have been used to prepare processable conjugated polymers via a dehydrochlorination reaction with a 1,4-bis(halogenomethyl) benzene as monomer. For example, the preparation of poly (2-methoxy-5-(2'-ethyl-hexyloxy)-p-phenylene vinylene) from 2,5-bis(chloromethyl)-1-methoxy-4-(2'-ethyl-hexyloxy)benzene is described in U.S. Pat. No. 5,189,136. Another example is the preparation of poly(2,5-di-n-hexyloxy-p-phenylene vinylene) (W. J. Swatos et al., Polymer Prepr. 31(1) (1990) 505). However, the use of the dehydrohalogenation reaction for the preparation of processable conjugated polymers or precursor polymers thereof is limited to specific compounds, since otherwise insoluble and infusible materials are obtained (see for instance H. H. H örhold and J. Opfermann, Makromol. Chem. 131 (1970) 105).

It is known (see for instance W. B. Liang, M. Masse and F. Karasz, Polymer 33 (1992) 3101) that in the synthesis according to Wessling the yield improves and the resulting polymer has a higher molecular weight if an apolar solvent, e.g. hexane, is added to the aqueous reaction mixture.

There have been attempts to generalize the precursor-route (see, e.g., F. Louwet, D. Vanderzande and J. Gelan, Synth. Met. 52 (1992) 125) or to adapt it to the synthesis of poly(2,5-heteroarylene vinylenes) (see, e.g., H. J. Geise et al., Synth. Met. 51 (1992) 329).

However, up to now the materials prepared by these processes have not been satisfactory with respect to molecular weight, chemical and thermal stability and processability. A high molecular weight is advantageous if the polymers are to have good film forming properties and mechanical stability, and to minimize the end-group concentration, since end-groups are likely to influence adversely on properties like electroluminescence.

There is clearly room for improvement of the synthesis of PPV and related compounds.

As there is also a steady demand to develop new materials for use in electroluminescent devices, it was highly desirable to find a general synthetic route to such polymers.

Surprisingly, it has now been found that high molecular weight precursor polymers of PPVs which are chemically and thermally stable are obtainable in good yields if the formation of the actual monomer, i.e., the p-xylylene or a derivative thereof, is carried out in specific solvents, or mixtures thereof, and is accompanied by the formation of a salt which is essentially soluble in the reaction medium, and the monomer and polymer are soluble in the reaction medium.

If extremely high molecular weights are reached, some precipitation of the high molecular weight material may occur.

Accordingly, the object of the invention is a process for producing polymers of α,ω-unsaturated conjugated compounds, which comprises reacting a compound of the formula (I),

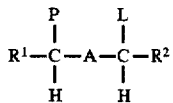
(I)

wherein

P denotes —SR³, —SO—R³, —SO₂—R³, —COOR³, NO₂, —CN, CF₃ or R³;

L denotes —Cl, —Br, —I, —O-tosylate, —O-mesylate, —O-triflate, —(NR³₃)⊕ or —(SR³R⁴)⊕;

R¹, R² are the same or different and denote H, R³ or P;

R³, R⁴ the same or different, a straight chain or branched alkyl group with 1 to 20 carbon atoms, phenyl or benzyl, either of which can be substituted once or twice with —R³, —OR¹, —NO₂, —CN, Br, Cl, F; or R³ and R⁴ together are —(CH₂)₄ or —(CH₂)₅— and A denotes an aromatic system, comprising from 4 to 20 carbon atoms which can optionally be substituted;

with a base in a solvent, characterized in that on reaction of the base with the compound of the formula (I) a polymer is formed which is essentially soluble in said solvent, and a salt is formed as a by-product, which is essentially soluble in said solvent, and that said solvent comprises a compound selected from the group consisting of a) amides of the general formula (II)

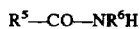
(II)

b) amines of the general formula (III)

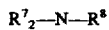
(III)

c) sulfones of the general formula (IV)

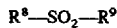
(IV)

d) sulfoxides of the general formula (V)

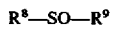
(V)

e) a solvent from the group consisting of alcohols, polyalcohols, glycols and polyethers;

wherein

R⁵, R⁶ are the same or different and denote H, a straight chain or branched alkyl group, or R⁵ and R⁶ together are —(CH₂)₂—, —(CH₂)₃—, CH₂—CH=CH₂—CH₂ or —(CH₂)₄—, and R⁷ has the meaning of R⁵ or is a phenyl group which is unsubstituted or substituted by halogen, methyl and/or methoxy groups, and R⁸, R⁹ are the same or different and have the meaning of R⁷, except H, or R⁸ and R⁹ together are —(CH₂)₂—, —(CH₂)₃—, —(CH₂)₄— or —CH₂—CH=CH—CH₂—.

Essentially soluble means that the polymer is soluble in the solvent up to a high molecular weight, preferably up to a molecular weight of at least $1.10^6$ ($M_w$), however, it is understood that if extremely high molecular weights are reached, some precipitation of the extremely high molecular weight material can occur.

According to the invention chemically and thermally stable, high molecular weight polymers of high purity and high regularity are obtained in good yield. If the products of the novel process carry groups that undergo elimination to form double bonds, high quality electroluminescent materials can be prepared. However, no substantial elimination occurs during the formation of the precursor polymer.

Preferred starting material are such in which aromatic group

A denotes 1,4-phenylene, 2,6-naphthalenediyl, 1,4-naphthalenediyl, 1,4-anthracenediyl, 2,6-anthracenediyl, 9,10-anthracenediyl, 2,5-thienylene, 2,5-furandiyl, 2,5-pyrroldiyl, 1,3,4-oxadiazol-2,5-diyl, 1,3,4-thiadiazol-2,5-diyl, 2,5-benzo[c]furandiyl, 2,5-benzo[c]pyrroldiyl, 2,5-benzo[c]thienylene, thieno[3,2-b]thiophene-2,5-diyl, pyrrolo[3,2-b]pyrrol-2,5-diyl, pyrene-2,7-diyl, 4,5,9,10-tetrahydropyren-2,7-diyl, 4,4-biphenylen, phenanthren-2,7-diyl, 9,10-dihydrophenanthren-2,7-diyl, carbazol-2,7-diyl, which can be substituted on the nitrogen by an alkyl group, preferably having from 1 to 22 carbon atoms or an arylgroup, preferably having from 2 to 10 carbon atoms, dibenzofuran-2,7-diyl, or dibenzothiophen-2,7-diyl, in all of which H-atoms on the aromatic rings can be substituted by linear or branched hydrocarbon groups having 1 to 22 carbon atoms such as methyl, ethyl, propyl, isopropyl, butyl, t-butyl, pentyl, hexyl, heptyl, octyl, lauryl and octadecyl, and electron donating groups like linear or branched alkoxy groups having 1 to 22 carbon atoms, such as methoxy, ethoxy, propoxy, isopropoxy, butoxy, t-butoxy, pentyloxy, hexyloxy, heptyloxy, octyloxy, lauryloxy, octadecyloxy or halogen atoms or electron withdrawing groups like cyano, nitro or ester groups.

Especially preferred starting materials are such in which aromatic group A includes 1,4-phenylene, 2,6-naphthalenediyl, 1,4-naphthalenediyl, 1,4-anthracenediyl, 2,6-anthracenediyl, 9,10-anthracenediyl, 2,5-thienylene, 2,5-furandiyl, 2,5-pyrroldiyl, 1,3,4-oxadiazol-2,5-diyl, 1,3,4-thiadiazol-2,5-diyl, 2,5-benzo[c]furandiyl, 2,5-benzo[c]pyrroldiyl, 2,5-benzo[c]thienylene, thieno[3,2-b]thiophene-2,5-diyl or pyrrolo[3,2-b]pyrrol-2,5-diyl in which H-atoms on the aromatic rings can be substituted by linear or branched hydrocarbon groups having 1 to 22 carbon atoms such as methyl, ethyl, propyl, isopropyl, butyl, t-butyl, pentyl, hexyl, heptyl, octyl, lauryl and octadecyl, and electron donating groups like linear or branched alkoxy groups having 1 to 22 carbon atoms, such as methoxy, ethoxy, propoxy, isopropoxy, butoxy, t-butoxy, pentyloxy, hexyloxy, heptyloxy, octyloxy, lauryloxy, octadecyloxy or halogen atoms or electron withdrawing groups like cyano, nitro or ester groups.

Particularly preferred starting materials are such in which aromatic group A includes p-phenylene, 4,4'-biphenylene, mono $C_{1-22}$-alkyl-p-phenylene, mono-$C_{1-22}$-alkoxy-p-phenylene, 2,5-di-$C_{1-22}$-alkyl-p-phenylene, 2,5-di-$C_{1-22}$-alkoxy-p-phenylene, 2,5-thienylene, 3-$C_{1-22}$-alkyl-2,5-thienylene, 2,5-di-$C_{1-22}$-alkoxy-2,5-thienylene, more specifically p-phenylene, 4,4'-biphenylene, monomethyl-p-phenylene, monomethoxy-p-phenylene, 2,5-dimethyl-p-phenylene, 2,5-dimethoxy-p-phenylene, monoethyl-p- phenylene, 2,5-diethoxy-p-phenylene, 2,5-diethyl-p-phenylene, monobutyl-p-phenylene, monobutoxy-p-phenylene, 2,5-dibutoxy-p-phenylene, 2,5-diheptyl-p-phenylene, 2,5-diheptyloxy-p-phenylene, 2,5-dioctyl-p-phenylene, 2,5-dioctyloxy-p-phenylene, 2,5-dilauryl-p-phenylene, 2,5-dilauryloxy-p-phenylene, 2,5-distearyl-p-phenylene, 2,5-distearyloxy-p-phenylene, 2,5-di-t-butoxy-p-phenylene 2,5-dicyano-p-phenylene, 2-(2-ethyl-hexoxy)-5-methoxy-p-phenylene. More preferred are p-phenylene, 4,4'-biphenelene, 2,5-dimethyl-p-phenylene, 2,5-dimethoxy-p-phenylene, 2,5-diethoxy-p-phenylene, 2,5-dibutoxy-p-phenylene, 2,5-diheptyloxy-p-phenylene, 2,5-dilauryloxy-p-phenylene and p-phenylene, 4,4'-biphenylene.

The following compounds are examples of further preferred precursor monomers

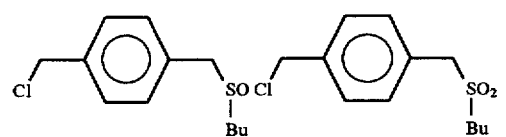

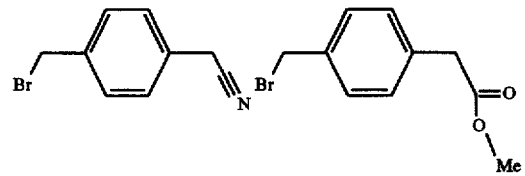

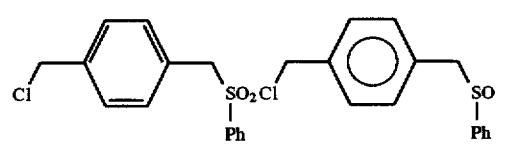

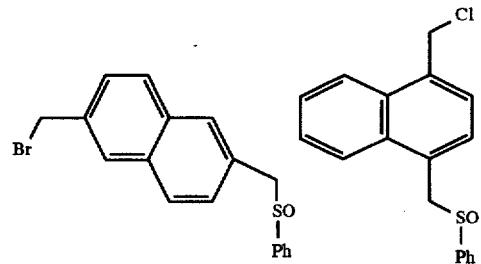

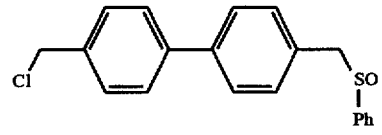

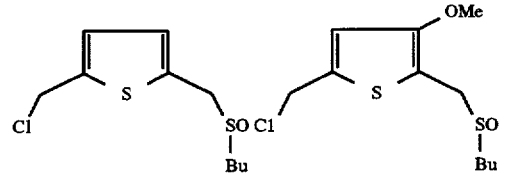

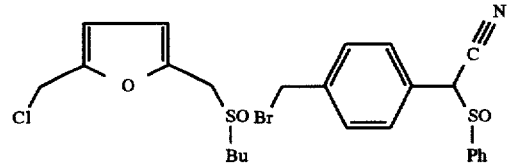

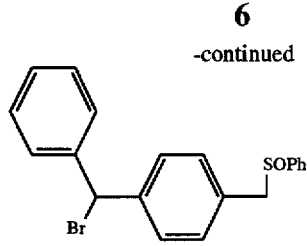

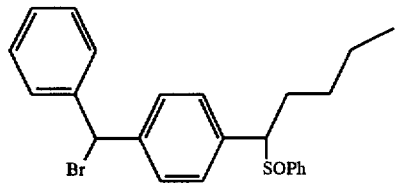

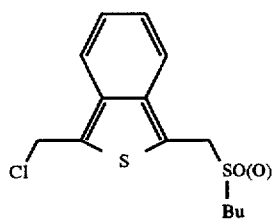

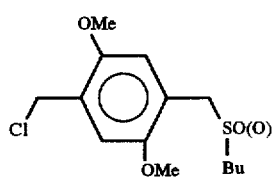

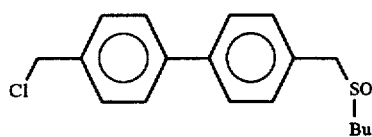

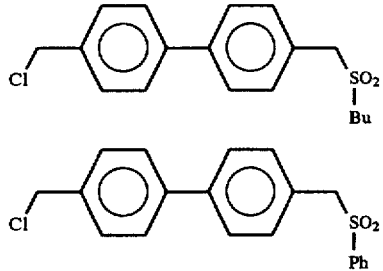

The compounds of the formula (I) are known per se from the literature. The synthesis of these compounds is described, for example, in W. B. Liang et al., J. Polym. Sci., Polym. Chem. 28 (1990) 2867; I. Murase et al., Synth. Met. 17 (1987) 639; R. M. Gregorius et al., Macromolecules 25 (1992) 6664; N. Tsuyoshi, EP-A-0 044 381, F. R. Denton III et al., J. Polym. Sci., Polym. Chem. 30 (1992) 2233.

It goes without saying that mixtures of different precursor monomers of the formula (I) can also be used, which leads to copolymers.

The precursor monomer of the general formula (I) is reacted with a base to form the actual monomer of the polymerization (scheme 1, steps 2 and 3).

Scheme 1

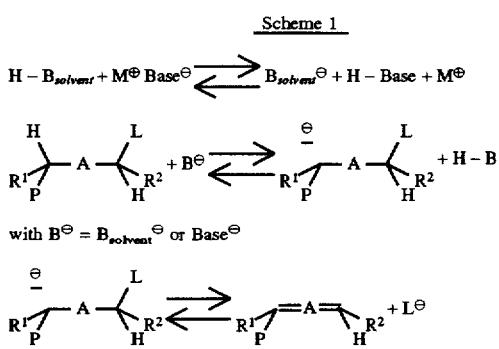

If $pK_A$ (solvent) is smaller than $pK_A$ (base), the equilibrium in step 1 lies to the right and the deprotonated solvent acts as the actual base.

In general all kinds of metal bases and ammonium bases can be used also noncharged bases such as amines, like triethylamine or pyridine are also suitable. Classes of metal and ammonium bases are e.g., metal hydrides, like NaH, KH, metal hydroxides, such as NaOH, LiOH, KOH, metal alkoxides, such as NaOMe, NaOEt, KOtBu, metal amides, such as $NaNH_2$, $NaN(SiMe_3)_2$, lithiumdiisopropylamide (LDA), organometal compounds, like n-BuLi, Grignard reagents, and substituted ammonium hydroxides.

In polar aprotic solvents it is especially advantageous to use metal hydrides as they show no nucleophilic properties. In polar protic solvents it is preferred to use bases with a $pK_A$ larger than the $pK_A$ of the solvent. In this case the solvent is deprotonated and the deprotonated solvent acts as the actual base. This introduces a base equalizing effect. As a consequence the $M_w$ of the polymer will be independent of the base used. The presence of the relatively weak base also reduces possible polymer degradation.

Generally, the amount of base can vary between 100 and 0.1 equivalents with respect to the monomer precursor. Preferably, 50 to 0.5 equivalents of base with respect to the monomer precursor are used. It is especially preferred to employ 10 to 1 equivalents of base per mol of monomer precursor. An excess of base usually improves polymer yield and molecular weight, especially when the solubility of the monomer precursor is low. In the case of polar aprotic solvents the excess of base is preferably limited to 10 equivalents per mol of monomer precursor in order to avoid excessive degradation of the polymer.

The process of the invention is carried out in a solvent comprising at least one compound selected from the group consisting of a) amides of the general formula (II)

$R^5$—CO—$NR^6H$  (II)

b) amines of the general formula (III)

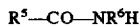  (III)

c) sulfones of the general formula (IV)

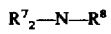  (IV)

d) sulfoxides of the general formula (V)

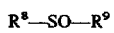  (V)

e) a solvent from the group consisting of alcohols, polyalcohols, glycols and polyethers;

wherein $R^5$, $R^6$ are the same or different and denote H, or a straight chain or branched alkyl group, or $R^5$ and $R^6$ together are —$(CH_2)_2$—, —$(CH_2)_3$— or —$(CH_2)_4$—, and $R^7$ has the meaning of $R^5$ or a phenyl group or a phenyl group substituted by halogen, methyl and methoxy groups, $R^8$, $R^9$ are the same or different and have the meanings of $R^7$, except H, or $R^8$, $R^9$ together are —$(CH_2)_2$—, —$(CH_2)_3$—, —$(CH_2)4$— or —$CH_2$—CH=CH—$CH_2$—.

Particularly preferred examples of compounds from groups (a) to (e) include monomethyl formamide (MMF), imidazolidone, pyrrolidone, dimethylsulfoxide, sulfolane, sulfolene, 1,3-dimethylimidazolidine-2-one, triethanolamine, glycerine, and triethylenglykol.

It is also possible to use solvent mixtures. It is preferred to use mixtures of solvents of groups (a) to (e) with weakly polar or non-polar aprotic solvents. For example mixtures of MMF and dichloromethane can be used.

Mixtures of MMF and water are also preferred.

The solvent used should be able to dissolve the precursor monomer, the actual monomer and the polymer.

In an aprotic polar solvent the concentration of the initiating species depends on the base strength and the nucleophilic properties of the base used. It is preferable to have a base with low nucleophilic character in these cases.

When carrying out the process of the invention care has to be taken to choose the precursor monomer, base and solvent in such a way that the salt formed in the reaction of the base with the precursor monomer and the precursor polymer which forms in the reaction are essentially soluble in the reaction medium.

This can be easily achieved, e.g., by checking the solubility of the salt in the given solvent in a standard handbook on the physical properties of the chemical compounds, such as H. Stephen and T. Stephen, "Solubilities of Inorganic and Organic Compounds", Pergamon Press (1963).

The temperature of the reaction is chosen as a function of the solubility of the precursor monomer, the actual monomer and the polymer. The highest temperature used should be lower then the degradation temperature of the polymer, and the lowest temperature used should be higher than the temperature limit under which there is no formation of the actual monomer (e.g., the quinodimethane system).

In general the reaction is carried out between −78° C. and 200° C., preferably between −40° C. and 120° C., and especially preferably between −20° C. and 30° C.

Usually the reaction is completed within 24 hours, preferably within 8 hours, more preferably within 3 hours.

In general the novel process is carried out in an inert atmosphere, e.g. under nitrogen or argon.

The working up of the polymer formed in the reaction is conducted according to methods well known to anyone skilled in the art. For instance in the case of polymers that are insoluble in water the polymer can be precipitated by adding water. The crude product which is obtained in this way can be further purified e.g. by reprecipitation, extraction or dialysis (see for instance B. Vollmert "Grundriss der Makromolekularen Chemie", Bd. II, E. Vollmert-Verlag (1988)).

The product of the novel process is a polymer comprising recurring units of the general formula (VI),

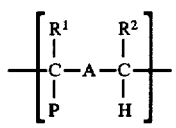

(VI)

wherein

A, R¹, R² and P have the same meaning as in general formula (I).

Preferably the precursor polymer of the general formula (VI) has a molecular mass $M_w$ of more than $3 \cdot 10^5$, more preferably more than $7 \cdot 10^5$, particularly preferred from $1 \cdot 10^6$ to $5 \cdot 10^6$.

The polymers prepared by the novel process can, e.g., be used as intermediates for producing conjugated polymers, such as PPV.

Polymers of the general formula (VI) which contain a group that can undergo 1,2-elimination can be further reacted to yield fully or partly conjugated polymers, such as poly(p-phenylene vinylene). Suitable groups for elimination include, sulfoxides, sulfones, esters and the like.

Dependings on the leaving group present in the precursor polymer the elimination can be carried out e.g. by thermal treatment and/or under acidic or basic conditions, according to methods known from the literature (see for instance D. A. Halliday et al, Adv. Mater. 5 (1993) 40). The elimination can be carried out before and/or after processing depending on the solubility of the resulting conjugated polymer. For example, the elimination step of precursors of side group solubilized poly(p-phenylene vinylene) such as poly(2,5-dihexyloxy-p-phenylene vinylene), can be performed after processing, while poly(p-phenylene vinylene) has to be processed in the precursor state. The temperature range usually chosen for thermal elimination lies between 80° to 300° C. and depends on the nature of the aromatic units, the substituents on the aromatic units, the nature of the eliminating groups and experimental conditions, e.g., quality of an applied vacuum, neutral, acidic or basic environment.

By employing the polymers of the inventive process conjugated polymers with high molecular weights are obtainable.

Preferred conjugated polymers that are obtained by the novel process are those having repeating units of the general formula (VII),

[—A—CH=CH—]        (VII)

wherein

A has the meaning given in formula (I).

Preferably polymers of the general formula (VII) have a molecular weight of more than $3 \cdot 10^5$, more preferred $7 \cdot 10^5$, particularly preferred $1 \cdot 10^6$ to $5 \cdot 10^6$.

A further object of the invention is a process for producing conjugated polymers comprising a) reacting a compound of the general formula (I)

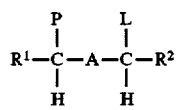

(I)

wherein

P is —SR³, —SO—R³, —SO₂—R³, —COOR³, —NO₂, —CN, CF₃ or R³;

L is —Cl, —Br, —I, —O-Tosylate, —O-Mesylate, —O—Triflate, —(NR³₃)⊕ or —(SR³R⁴)⊕;

R¹, R² are the same or different and denote H, R³ or P; R³, R⁴ a straight chain or branched alkyl group with 1 to 20 carbon atoms, phenyl or benzyl, either of which can be substituted once or twice with —R³, —OR¹, —NO₂, —CN, Br, Cl, F; or R³ and R⁴ together are —(CH₂)₄ or —(CH₂)₅— and A denotes an aromatic system comprising from 4 to 20 carbon atoms, which can optinally be substituted;

with a base in a solvent, characterized in that on reaction of the base with the compound of the formula (I) a polymer is formed which is essentially soluble in said solvent, and a salt is formed as a by-product, which is essentially soluble in said solvent, and that said solvent comprises a compound selected from the group consisting of a) amides of the general formula (II)

R⁵—CO—NR⁶H        (II)

b) amines of the general formula (III)

R⁷₂—N—R⁸        (III)

c) sulfones of the general formula (IV)

R⁸—SO₂—R⁹        (IV)

d) sulfoxides of the general formula (V)

R⁸—SO—R⁹        (V)

e) a solvent from the group consisting of alcohols, polyalcohols, glycols and polyethers;

wherein

R⁵, R⁶ are the same or different and denote H, a straight chain or branched alkyl group, or R⁵ and R⁶ together are —(CH₂)₂—, —(CH₂)₃— or —(CH₂)₄—;

R⁷ has the meaning of R⁵ or a phenyl group or a phenyl group substituted by halogen, methyl and/or methoxy groups and R⁸, R⁹ are the same or different and denote R⁷, except H, or R⁸ and R⁹ together are —(CH₂)₂—, —(CH₂)₃—, —(CH₂)₄— or —CH₂—CH=CH—CH₂, whereupon a polymer is formed, which is essentially soluble in said solvent, and a salt is formed as a by-product, which is essentially soluble in said solvent, b) optionally isolating said polymer, and c) treating said polymer under conditions effecting elimination of H—P (P having the meaning given in formula (I)), thus forming a conjugated polymer.

Conjugated in the sense of the invention does not necessarily mean that the polymer is fully conjugated; however, substantial parts of the polymer have to be conjugated.

Conjugated polymers prepared according to the invention can be used as electroluminescent layers and/or charge transport layers in electroluminescent devices (e.g., WO 90/13148 and EP-A-0 443 861). The polymers can also be used, after doping, for conductive polymer applications, e.g., antistatic surfaces and electromagnetic shielding. Further, the polymers are useful for high temperature applications, e.g., thermally stable coatings.

The invention is illustrated but not limited by the examples which follow.

EXAMPLES

A. Starting Materials

α,α'-Dichloro-p-xylene, n-butanethiol and sodium tert.-butoxid were used as purchased from Janssen Chimica. 2,5-Bis(chloromethyl)-p-xylene and Aliquat 336 were used as purchased from Aldrich. Tellurdioxide and hydrogen peroxide (35% in water) were used as purchased from Merck. N-Methylformamide (MMF) were dried and purified as described in the literature. All other solvents were of p.a. quality.

B. Monomer Synthesis

Example 1

α-Chloro-α'-n-butylsulfinyl-p-xylene

A mixture of 99.7 g (0.57 mol) α,α'-dichloro-p-xylene in 1000 ml toluene, 60 g NaOH (1.5 mol) in 1000 ml $H_2O$ and 2.5 g of a phase transfer catalyst Aliquat 336 was stirred vigorously at ambient temperature. To this mixture a solution of 30.5 ml butanethiol (0.285 mol) in 300 ml toluene was added dropwise over a period of 24 hours. The mixture was stirred for another 2 hours. The organic layer was separated, washed with water, dried over $MgSO_4$, filtered and evaporated on a rotary evaporator to give white-yellow crystals. The crystals (mixture of α,α'-dichloro-p-xylene and a-chloro-α'-n-butylsulfide-p-xylene) were dried under vacuum to constant weight. This crude material was used without further purification in the following oxidation step.

4.614 g of a catalyst $TeO_2$ ($2.891 \cdot 10^{-2}$ mol) was added to a solution of the crude material in 1200 ml of MeOH. Under nitrogen protection and vigorously stirring 64.66 ml (0.5702 mol) of a hydrogen peroxide solution (35 wt % solution in water) was added dropwise. The reaction was stirred vigorously at room temperature until a slight over oxidation was visible by thin layer chromatography. The reaction was quenched by adding 800 ml of a saturated NaCl solution. The water layer was extracted one time with 600 ml $CHCl_3$ and 2 times with 400 ml $CHCl_3$. The combined $CHCl_3$ layers were dried over $MgSO_4$, filtered and evaporated on a rotary evaporated to give white crystals (mixture of α,α'-dichloro-p-xylene and a-chloro-α'-n-butylsulfinyl-p-xylene). The two products were separated by column chromatography (silica/$CHCl_3$). α,α'-Dichloro-p-xylene can be used again after recrystallization from toluene. α-Chloro-α'-n-butylsulfinyl-p-xylene was recrystallized from a mixture of hexane/$CH_2Cl_2$, washed with ice cold diethylether and dried under vacuum. Yield: 53.7 g (77%) of white crystals were obtained; m.p. 112°–113° C.

Example 2

α-Chloro-α'-n-butylsulfinyl-2,5-dimethyl-p-xylene

A mixture of 20.0 g 2,5-bis(chloromethyl)-p-xylene (0.0985 mol) in 300 ml toluene, 10 g NaOH (0.25 mol) in 250 ml $H_2O$ and 0.5 g of a phase transfer catalyst Aliquat 336 was stirred vigorously at ambient temperature. To this mixture a solution of 5.32 ml butanethiol (0.0497 mol) in 65 ml toluene was added dropwise over a period of 24 hours. The mixture was stirred for another 2 hours. The organic layer was separated, washed with water, dried over $MgSO_4$, filtered and evaporated on a rotary evaporator to give white-yellow oil. This crude material (mixture of 2,5-bis(chloromethyl)-p-xylene and α-chloro-α'-n-butylsulfide-2,5-dimethyl-p-xylene) was used without further purification in the following oxidation step.

0.78 g of a catalyst $TeO_2$ ($4.93 \cdot 10^{-3}$ mol) was added to a solution of the crude material in 200 ml of MeOH. Under vigorous stirring 9.57 ml (0.1113 mol) of a hydrogen peroxide solution (35 wt % solution in water) was added dropwise. The reaction was stirred vigorously at room temperature until a slight over oxidation was visible by thin layer chromatography. The reaction was quenched by adding 150 ml of a saturated NaCl solution. The water layer was extracted one time with 200 ml $CHCl_3$ and 2 times with 80 ml $CHCl_3$. The combined $CHCl_3$ layers were dried over $MgSO_4$, filtered and evaporated on a rotary evaporated to give white crystals (mixture of 2,5-bis(chloromethyl)-p-xylene and α-chloro-α'-n-butylsulfinyl-2,5-dimethyl-p-xylene). The two products were separated by column chromatography (silica/$CHCl_3$). 2,5-bis(chloromethyl)-p-xylene can be used again after recrystallization from toluene. α-Chloro-α'-n-butylsulfinyl-2,5-dimethyl-p-xylene was recrystallized from a mixture of hexane/$CH_2Cl_2$ (200 ml/20 ml), washed with ice cold diethylether and dried under vacuum. Yield: 6.0 g (44.5%) of white crystals were obtained; m.p. 111.5°–112.5° C.

Example 3a 4,4-Bis(hydroxymethyl)biphenyl

In a 1000 ml three-necked flask, fitted with an efficient condenser, a thermometer and a dropping funnel, is placed a suspension of 6,2 g (0.144 mol) $LiAlH_4$ in 80 ml dry THF under an inert atmosphere. A solution of 30 g (0.122 mol) dimethyl 4,4'-biphenyldicarboxylate in 250 ml dry THF is added dropwise over a period of 30 minutes. The mixture is refluxed with stirring for 1 hour. The mixture is cooled to −20° C. and 80 ml of $H_2O$ is added dropwise, followed by slow addition of 80 ml of 20% $H_2SO_4$ (aq.). The THF is evaporated under reduced pressure to give a suspension of colourless product in aqueous acid. The product is filtered and washed with $H_2O$. After recrystallisation from aceton, white crystals are obtained. Yield: 93%; melting point: 187.3° C.–188.5° C.

Example 3b 4,4'-Bis(chloromethyl)biphenyl

In a 50 ml flask fitted with a condensor is placed 1 g (0.005 mol) of 4,4'-bis(hydroxymethyl)biphenyl and 2 g (0.01 5 mol) $ZnCl_2$. 17 ml concentrated HCl is added while the reaction mixture is stirred. The reaction mixture is refluxed for 4 hours and then poured into 200 ml $H_2O$. The brownish product refluxed is filtered, dissolved in $CHCl_3$ and washed with water. The organic layer is dried ($MgSO_4$) and evaporated under reduced pressure. The product is purified by column chromatography (10 g silica/product; solvent: hexane/$CHCl_3$ (50/50)) and recrystallised from hexane to give colourless crystals. Yield: 83%; melting point: 140.2° C.–141.4° C.

Example 3c

4-Chloromethyl-4'-(n-butylsulphinylmethyl)biphenyl 15 g (0.06 mol) 4,4'-bis(chloromethyl)biphenyl is dissolved in 105 ml toluene. 6.3 g (0(0.157 mol) NaOH dissolved in 250 ml $H_2O$ is added together with 0.26 g of a phase transfer catalyst, Aliquat 336. To this solution a mixture of 3.2 ml (0.029 mol) n-butylmercaptane dissolved in 32 ml dry THF is added dropwise overnight. The mixture is then stirred for another 60 minutes. The organic layer is separated, washed with water, dried over $MgSO_4$, filtered and evaporated on a rotary evaporator to give white crystals. The crystals are recrystallised from hexane to give colourless 4,4'-bis(chloromethyl)biphenyl. The filtrate is evaporated on a rotary evaporator and gave an oil which consisted of 4-chloromethyl-4'-(n-butylthiomethyl)biphenyl and some residual educt.

0.49 g (0.003) $TeO_2$ is added to a solution of the crude material in 180 ml MeOH. Under vigorous stirring, 7 ml (0.062 mol) of a hydrogen peroxide solution (35 wt % in water) is added dropwise. The mixture is stirred at room temperature until a slight oxidation to the sulfon appears on TLC. The reaction is quenched by adding 150 ml of a saturated NaCl solution. The water layer is extracted with CHCl$_3$. The combined organic layers are dried over MgSO$_4$, filtered and evaporated on a rotary evaporator to give colorless crystals. The different products 4,4'-bis(chloromethyl)biphenyl, 4-chloromethyl-4'-(n-butylsulphinylmethyl)biphenyl and 4,4'-bis-(n-butylsulphinylmethyl)biphenyl, are separated by column chromatography (50 g silica/g product; solvent: CHCl$_3$) to give colourless crystals. Yield: 38%; melting point: 172.8° C.–173.7° C.

Example 4

α,α'-bis(n-butylsulphinyl)-p-xylene 5 g (0.029 mol) α,α'-dichloro-p-xylene, 6.6 ml (0.06 mol) n-butylmercaptane, 3 g (0.075 mol) NaOH, 50 ml water, 60 ml toluene and 100 mg methyltricaprylammonium chloride (Aliquat 336) are combined and stirred vigorously for 20 minutes at room temperature. The organic layer is separated, washed with water, dried over MgSO$_4$ and evaporated on a rotary evaporator to give α,α'-bis(n-butylthio)-p-xylene, which is a colourless oil.

0.12 g (0.73 mmol) TeO$_2$ is added to a solution of 1 g α,α'-bis(n-butylthio)-p-xylene in 7.2 ml MeOH. With stirring, a 6.5 ml (0.057 mol) hydrogen peroxide solution (35 wt % in H$_2$O) is added dropwise. The reaction is stirred at room temperature for two hours. The reaction is stopped by adding the reaction mixture to a saturated NaCl solution. The water layer is extracted with CHCl$_3$. The organic layer is dried over MgSO$_4$, filtered and evaporated on a rotary evaporator to give colourless crystals of α,α'-bis(n-butylsulphinyl)-p-xylene. The crystals are purified by a recrystallisation from toluene. Yield: 70%; melting point: 187° C.–188.5° C.

Example 5

α,α'-bis(n-butylsulphinyl)-α'-chloro-p-xylene

To a solution of the bis-sulphoxide (0.5 g; 2 mmol) in CH$_2$Cl$_2$ at room temperature is added 0.1 g (0.75 mmol) N-chlorosuccinimide. After 6 hours the solution is washed with brine. The organic extract is dried over MgSO$_4$ and the solvent evaporated under reduced pressure. The crude product is purified by SiO$_2$ column chromatography (60 g silica/g product; solvent CHCl$_3$) and recrystallisation from toluene. Yield: 74%; melting point: 141.5° C.–142.8° C.

C. Polymerization

Example 6

Polymerization of α-chloro-α'-n-butylsulfinyl-p-xylene in N-methylformamide (MMF) at about 0° C.

6 g α-chloro-α'-n-butylsulfinyl-p-xylene (0.0245 mol) were dissolved in 100 ml MMF and the solution was flushed with nitrogen under stirring for 0.5 hours. 2.354 g NaOtBu (0.0245 mol) were dissolved in 20 ml MMF and the solution was flushed with nitrogen for 0.5 hours. The monomer solution was cooled to 0° C. and the base was added in one go. The polymerization was allowed to proceed at about 0° C. for 1 hour (still under a constant stream of nitrogen). Then the reaction mixture was poured into 400 ml H$_2$O and neutralized with diluted HCl. The white precipitate was filtered off, washed thoroughly with water and dissolved in 100 ml CHCl$_3$. The organic layer was separated from residual H$_2$O and concentrated on a rotary evaporator to about 50 ml. The polymer was precipitated in 800 ml diethylether/THF (1:1), filtered off, redissolved in 80 ml CHCl$_3$ and precipitated in 1200 ml heptane, filtered off again and dried under vacuum. Yield: 0.94 g; molecular weights according to GPC (polystyrene standards):

$M_w=1.3\cdot10^6$; $M_n=6.1\cdot10^5$; $M_w/M_n=2.1$

Example 7

Polymerization of α-chloro-α'-n-butylsulfinyl-p-xylene in N-methylformamide (MMF) at room temperature 6 g α-chloro-α'-n-butylsulfinyl-p-xylene (0.0245 mol) were dissolved in 100 ml dry MMF and the solution was flushed with dry nitrogen under stirring for 0.5 hour. 2.345 g NaOtBu (0.0245 mol) were added. The solution stayed clear. The polymerization was allowed to proceed at room temperature for 1 hour (still under a constant stream of nitrogen). Then the reaction mixture was poured into 600 ml H$_2$O and neutralized with a 0.1M HCl solution. The white precipitate was filtered off, washed thoroughly with water and dissolved in 150 ml CHCl$_3$. The organic layer concentrated on a rotary evaporator to about 50 ml. The polymer was precipitated in 600 ml diethylether, filtered off and dried under vacuum. Yield: 1.35 g; molecular weights according to GPC (polystyrene standards):

$M_w=4.4\cdot10^5$; $M_n=1.6\cdot10^5$; $M_w/M_n=2.7$

Example 8

Polymerization of α-chloro-α'-n-butylsulfinyl-p-xylene in (MMF)/H$_2$O (95/5)

6 g α-chloro-α'-n-butylsulfinyl-p-xylene (0.0245 mol) were dissolved in 95 ml dry MMF and 5 ml H$_2$O and the solution was flushed with nitrogen under stirring for 0.5 hour. 2.345 g NaOtBu (0.0245 mol) were added. The solution stayed clear. The polymerization was allowed to proceed at room temperature for 1 hour (still under a constant stream of nitrogen). Then the reaction mixture was poured into 600 ml H$_2$O and neutralized with a 0.1M HCl solution. The white precipitate was filtered off, washed thoroughly with water and dissolved in 150 ml CHCl$_3$. The organic layer was concentrated on a rotary evaporator to about 50 ml. The polymer was precipitated in 600 ml diethylether, filtered off and dried under vacuum. Yield: 1.25 g; molecular weights according to GPC (polystyrene standards):

$M_w=3.6\cdot10^5$; $M_n=1.10\cdot10^5$; $M_w/M_n=3.2$

Example 9

Polymerization of α-chloro-α'-n-butylsulfinyl-p-xylene in (MMF)/H$_2$O (90/10)

6 g α-chloro-α'-n-butylsulfinyl-p-xylene (0.0245 mol) were dissolved in 90 ml dry MMF and 10 ml H$_2$O and the solution was flushed with nitrogen under stirring for 0.5 hour. 2.345 g NaOtBu (0.0245 mol) were added. The solution stayed clear. The polymerization was allowed to proceed at room temperature for 1 hour (still under a constant stream of nitrogen). Then the reaction mixture was poured into 600 ml H$_2$O and neutralized with a 0.1M HCl solution. The white precipitate was filtered off, washed thoroughly with water and dissolved in 150 ml CHCl$_3$. The organic layer was concentrated on a rotary evaporator to about 50 ml. The polymer was precipitated in 600 ml diethylether, filtered off and dried under vacuum. Yield: 1.07 g; molecular weights according to GPC (polystyrene standards):

$M_w=5.3 \cdot 10^5$; $M_n=1.7 \cdot 10^5$; $M_w/M_n=3.2$

Example 10

Polymerization of α-chloro-α'-n-butylsulfinyl-p-xylene in (MMF)/$CH_2Cl_2$ (60/40)

6 g α-chloro-α'-n-butylsulfinyl-p-xylene (0.0245 mol) were dissolved in 60 ml dry MMF and 40 ml $CH_2Cl_2$ and the solution was flushed with dry nitrogen under stirring for 0.5 hour. 2.345 g NaOtBu (0.0245 mol) were added. The solution stayed clear. The polymerization was allowed to proceed at room temperature for 1 hour (still under a constant stream of nitrogen). Then the reaction mixture was poured into 1000 ml $CH_2Cl_2$, washed 3 times with 500 ml slightly acidic water (pH=3 to 4) and three times with 1000 ml water. The organic layer was concentrated to about 50 ml. The white polymer was precipitated in 600 ml diethylether, filtered off and dried under vacuum. Yield: 0.77 g; molecular weights according to GPC (polystyrene standards):

$M_w=8.9 \cdot 10^5$; $M_n=3.3 \cdot 10^5$; $M_w/M_n=2.7$

Example 11

Polymerization of α-chloro-α'-n-butylsulfinyl-p-xylene in (MMF)/$CH_2Cl_2$ (40/60)

6 g α-chloro-α'-n-butylsulfinyl-p-xylene (0.0245 mol) were dissolved in 40 ml dry MMF and 60 ml $CH_2Cl_2$ and the solution was flushed with dry nitrogen under stirring for 0.5 hour. 2.345 g NaOtBu (0.0245 mol) were added. The solution stayed clear. The polymerization was allowed to proceed at room temperature for 1 hour (still under a constant stream of nitrogen). Then the reaction mixture was poured into 1000 ml $CH_2Cl_2$ washed 3 times with 500 ml slightly acidic water (pH=3 to 4) and three times with 1000 ml water. The organic layer was concentrated to about 50 ml. The white polymer was precipitated in 600 ml diethylether, filtered off and dried under vacuum. Yield: 2.04 g; molecular weights according to GPC (polystyrene standards):

$M_w=7.6 \cdot 10^5$; $M_n=2.2 \cdot 10^5$; $M_w/M_n=3.5$

Example 12

Polymerization of α-chloro-α'-n-butylsulfinyl-2,5-dimethyl-p-xylene in N-methylformamide (MMF)

3 g (0.0110 mol) of α-chloro-α'-n-butylsulfinyl-2,5-dimethyl-p-xylene were dissolved in 45 ml MMF and the solution was flushed with nitrogen under stirring for 0.5 hours. 1.06 g (0.0110 mol) NaOtBu were dissolved in 20 ml MMF and the solution was flushed with nitrogen for 0.5 hours. The monomer solution was stirred at room temperature and the base was added in one go. The polymerization was allowed to proceed at about 0° C. for 1.5 hours (still under a constant stream of nitrogen). Then the reaction mixture was poured into 200 ml $H_2O$ and neutralized with diluted HCl. The white precipitate was filtered off, washed thoroughly with water and dissolved in 80 ml $CHCl_3$. The organic layer was separated from residual $H_2O$ and concentrated on a rotary evaporator to about 40 ml. The polymer was precipitated in diethylether/THF (350 ml: 50 ml), filtered off, redissolved in 20 ml $CHCl_3$ and precipitated in 200 ml cold ether, filtered off again and dried under vacuum. Yield: 0.56 g; molecular weights according to GPC (polystyrene standards):

$M_w=4.70 \cdot 10^5$; $M_n=1.85 \cdot 10^5$ ; $M_w/M_n=2.5$

Example 13

Polymerisation of 4-chloromethyl-4'-(n-butylsulphinylmethyl)biphenyl in a mixture of tetrahydrofuran (THF) and dimethyl sulphoxide (DMSO)

393 mg (1 mmol) of 4-chloromethyl-4'-(n-butylsulphinylmethyl)biphenyl are dissolved in a mixture of 6 ml DMSO and 4 ml THF. This solution is flushed dissolved with dry nitrogen under vigorous stirring for 1 hour. 125 mg (1.3 eq.) $Na^+tBuO^-$ is added. The solution becomes turbid because the polymer precipitates partly. The polymerisation is allowed to proceed at room temperature for 1 hour (still under a constant stream of nitrogen). Then the reaction mixture is poured into 100 ml $H_2O$ and neutralized with a 0.1M HCl solution. The suspension is extracted twice with 50 ml chloroform. The organic layers are separated from the water layer, combined and concentrated on a rotary evaporator to 5 ml. The polymer is precipitated in 200 ml diethylether, filtered and dried under vacuum. Yield: 45%; molecular weights and polydispersity according to GPC (polystyrene standards):

$M_w=27.500$; $M_n=10.100$; $M_w/M_n=2.7$

Example 14

Polymerisation of α,α'-bis-n-butylsulphinyl-p-xylene in N-methylformamide (MMF)

349 mg (0.103 mol) of α,α'-bis-(n-butylsulphinyl)-p-xylene are dissolved in 10 ml dry MMF and the solution is flushed with dry nitrogen under vigorous stirring for 1 hour. 125 mg (1.3 equivalents) $Na^+tBuO^-$ are added. The solution stays clear. The polymerisation is allowed to proceed at room temperature for 1 hour (still under a constant stream of nitrogen). Then the reaction mixture is poured into 100 ml $H_2O$ and neutralized with a 0.1M HCl solution. The suspension is extracted twice with 50 ml chloroform. The organic layers are separated from the water layer, combined and concentrated on a rotary evaporator to 5 ml. The polymer is precipitated in 200 ml diethylether, filtered and dried under vacuum. Yield: 40%; molecular weights and polydispersity according to GPC (polystyrene standards):

$M_w=3800$; $M_n=3000$; $M_w/M_n=1.25$

D. Polymer Conversion

Example 15

Conversion to poly(p-phenylene vinylene), PPV

A PPV precursor polymer obtained as described in Example 3 was spin-coated from chloroform solution to give a homogeneous, colorless and transparent film.

The chloroform solution was easily filterable through a μm-filter. The film showed no yellowing when stored several weeks at normal atmosphere and room temperature. The precursor film was converted by thermal treatment (280° C./4 h/$10^{-3}$ mbar) to a homogeneous, yellow and transparent PPV film, which was highly fluorescent (yellow-green). The infrared spectrum of the PPV film was in accordance with those known from literature (e.g., D. D. C. Bradley, J. Phys., Appl. Phys. 20 (1987) 1389).

Example 16

Conversion to poly(2,5-dimethyl-p-phenylene vinylene), DMe-PPV

A DMe-PPV precursor polymer obtained as described in Example 9 was spin-coated from chloroform solution to give a homogeneous, colorless and transparent film. The chloroform solution was easily filterable through a μm-filter. The film showed no yellowing when stored several weeks at normal atmosphere and room temperature. The precursor film was converted by thermal treatment (280° C./4 h/10⁻³ mbar) to a homogeneous, yellow and transparent DMe-PPV film, which was highly fluorescent (yellow-green). The infrared spectrum of the DMe-PPV film was in accordance with those known from literature (e.g., D. A. Halliday, Dissertation Thesis, University of Cambridge (1 992)).

Example 17

Electroluminescent device with poly(p-phenylene vinylene), PPV, as luminescent layer A PPV precursor polymer obtained as described in Example 3 was spin-coated from chloroform solution (20 mg/ml, filtered through a μm filter) on an ITO covered glass substrate to give a homogeneous, colorless and transparent film. The precursor film was converted by thermal treatment (280° C./4 h/10⁻³ mbar) to a homogeneous, yellow and transparent PPV film. An aluminum electrode (area 2×2 mm, thickness 100 nm) was deposited on top of the PPV film by high vacuum vapor deposition. The electrodes were connected to a current source with the ITO being poled positively and the aluminum been poled negatively. A bright yellow green fluorescence was observed. The electroluminescence spectrum showed nearly the same features as the photoluminesence spectrum.

Example 18

Electroluminescent device with poly(2,5-dimethyl-p-phenylene vinylene), DMe-PPV, as luminescent layer A DMe-PPV precursor polymer obtained as described in Example 9 was spin-coated from chloroform solution (5 mg/ml, filtered through a μm filter) on an ITO covered glass substrate to give a homogeneous, colorless and transparent film. The precursor film was converted by thermal treatment (280° C./4 h/10⁻³mbar) to a homogeneous, yellow and transparent PPV film of about nm in thickness. A calcium electrode (area 2×2 mm, thickness 250 nm) was deposited on top of the PPV film by high vacuum vapor deposition. The electrodes were connected to a current source with the ITO being poled positively and the aluminum been poled negatively. A bright yellow green fluorescence was observed at an applied voltage of 15 V.

We claim:

1. A process for producing polymers of α,ω-unsaturated conjugated compounds, which comprises reacting a precursor monomer of the formula (I),

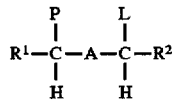

wherein

P denotes —SR³, —SO—R³, —SO₂—R³, —COOR³, —NO₂, —CN, —CF₃ or R³;

L denotes —Cl, —Br, —I, —O-tosylate, —O-mesylate, —O-triflate, —(NR³₃)⊕ or —(SR³R⁴)⊕;

R¹, R² are the same or different and denote H, R³ or P;

R³, R⁴ are independently, a straight chain or branched alkyl group with 1 to 20 carbon atoms, phenyl or benzyl, either of which can be substituted once or twice with —R³, —OR¹, —NO₂, —CN, Br, Cl, F; or R³ and R⁴ together are —(CH₂)₄ or —(CH₂)₅— and A an aromatic system comprising from 4 to 20 carbon atoms, which can optionally be substituted, and a base in the presence of a solvent, which comprises a compound selected from the group consisting of a) amides of the general formula (II)

b) amines of the general formula (III)

c) sulfones of the general formula (IV)

d) sulfoxides of the general formula (V)

e) a solvent from the group consisting of alcohols, polyalcohols, glycols and polyethers;

wherein

R⁵, R⁶ are the same or different and denote H, a straight chain or branched alkyl group, or R⁵ and R⁶ together are —(CH₂)₂—, —(CH₂)₃— or —(CH₂)₄—;

R⁷ has the meaning of R⁵ or a phenyl group which is unsubstituted or substituted by halogen, methyl and methoxy groups and R⁸, R⁹ are the same or different and denote R⁷, except H, or R⁸ and R⁹ together are —(CH₂)₂—, —(CH₂)₃—, —(CH₂)₄— or —CH₂—CH=CH—CH₂—, whereupon a polymer is formed which is essentially soluble in said solvent, and a salt is formed as a by-product, which is essentially soluble in said solvent.

2. The process as claimed in claim 1, in which the solvent comprises a compound of the formula (II),

wherein

R⁵, R⁶ have the same meaning as in formula (II) in claim 1.

3. An intermediate for producing electroluminescent materials, consisting of a polymer obtained by a process as claimed in claim 1.

4. A process for producing conjugated polymers which comprises

A) reacting a compound of the general formula (I)

wherein

P denotes —SR³, —SO—R³, —SO₂—R³, —COOR³, —NO₂, —CN, —CF₃ or R³;

L denotes —Cl, —Br, —I, —O-tosylate, —O-mesylate, —O-triflate, —(NR³₃)⊕ or —(SR³R⁴)⊕;

R¹, R² are the same or different and denote H, R³ or P;

R³, R⁴ are independently, a straight chain or branched alkyl group with 1 to 20 carbon atoms, phenyl or benzyl, either of which can be substituted once or twice with —R³, —OR¹, —NO₂, —CN, Br, Cl, F; or R³ and R⁴ together are —(CH₂)₄ or —(CH₂)₅— and A denotes an aromatic system comprising from 4 to 20 carbon atoms, which can optionally be substituted, and a base in the presence of a solvent, which comprises a compound selected from the group consisting of a) amides of the general formula (II)

$$R^5\text{—CO—NR}^6\text{H} \quad (II)$$

b) amines of the general formula (III)

$$R^7_2\text{—N—R}^8 \quad (III)$$

c) sulfones of the general formula (IV)

$$R^8\text{—SO}_2\text{—R}^9 \quad (IV)$$

d) sulfoxides of the general formula (V)

$$R^8\text{—SO—R}^9 \quad (V)$$

e) a solvent from the group consisting of alcohols, polyalcohols, glycols and polyethers;

wherein $R^5$, $R^6$ are the same or different and denote H, a straight chain or branched alkyl group, or $R^5$ and $R^6$ together are —$(CH_2)_2$—, —$(CH_2)_3$— or —$(CH_2)_4$—;

$R^7$ has the meaning of $R^5$ or a phenyl group which is unsubstituted or substituted by halogen, methyl and methoxy groups and $R^8$, $R^9$ are the same or different and denote $R^7$, except H, or $R^8$ and $R^9$ together are —$(CH_2)_2$—, —$(CH_2)_3$—, —$(CH_2)_4$— or —$CH_2$—$CH$=$CH$—$CH_2$—;

whereupon a polymer is formed, which is essentially soluble in said solvent, and a salt is formed as a by-product, which is essentially soluble in said solvent, B) optionally isolating said polymer, and C) treating said polymer under conditions effecting elimination of H—P (P having the meaning given in formula (I)), thus forming a conjugated polymer.

5. An electroluminescent device, comprising a polymer obtained by a process as claimed in claim 4.

* * * * *